Feb. 24, 1970     M. R. AMENDOLA     3,496,952

VALVE WITH SOLUBLE CLOSURE MEMBER

Filed Aug. 21, 1967

INVENTOR.
MICHAEL R. AMENDOLA
BY
Charles L. Lovercheck
atty

United States Patent Office 3,496,952
Patented Feb. 24, 1970

3,496,952
VALVE WITH SOLUBLE CLOSURE MEMBER
Michael R. Amendola, Erie, Pa., assignor to Hays Manufacturing Company, Erie, Pa., a corporation of Pennsylvania
Filed Aug. 21, 1967, Ser. No. 661,981
Int. Cl. F16l *55/00;* F16k *13/04*
U.S. Cl. 137—67                                    4 Claims

ABSTRACT OF THE DISCLOSURE

In the present invention, a hollow body having a tapered inside surface is provided with a closure member which is made of a soluble brittle material, so when liquid is turned on in the line the control member will dissolve and the solution of the dissolved member will not contaminate the liquid and render it unpotable. The soluble brittle material is broken by a pin which may be engaged by a hammer or other impact tool from the outside of the valve. The pin is disposed in a blind hole and the bottom of the blind hole adjacent the soluble member is very thin so that when the pin is struck, it will break the bottom of the hole and crack the soluble member. The pin is a taper pin.

---

This invention relates to valves and, more particularly, to valves for temporarily preventing the flow of liquid from a source through a valve.

This application replaces the presently used ground key corporation stop which consists of a bronze or brass tapered plug in a mating tapered body. The end pieces are shaped as needed for the particular pipe sizes and the joints desired. The ground key stop section is used only once because after the water connection is made, it is normally buried under the pavement of a street.

The corporation stop is inserted into a water main containing water under pressure (a "main" being a large pipe supplying water to many users along a street) with the stop portion in the closed position. A "service line" from the main to the user is then connected from the corporation stop to a curb stop of similar construction, said curb stop being on the sidewalk side of the curb.

With these lines in place, the corporation stop is opened, and enough water is allowed to flow through the curb stop to flush the service line of dirt, drilling chips, etc. The curb stop is then closed, and with the corporation stop still in the open position, the excavation is filled, leaving only the curb stop accessible for future use.

It is, accordingly, an object of the invention to provide an improved automatic release valve.

Another object of the invention is to provide a valve member that is simple in construction, economical to manufacture, and simple and efficient to use.

Another object of the invention is to provide a valve member having a closure made of soluble, brittle material.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
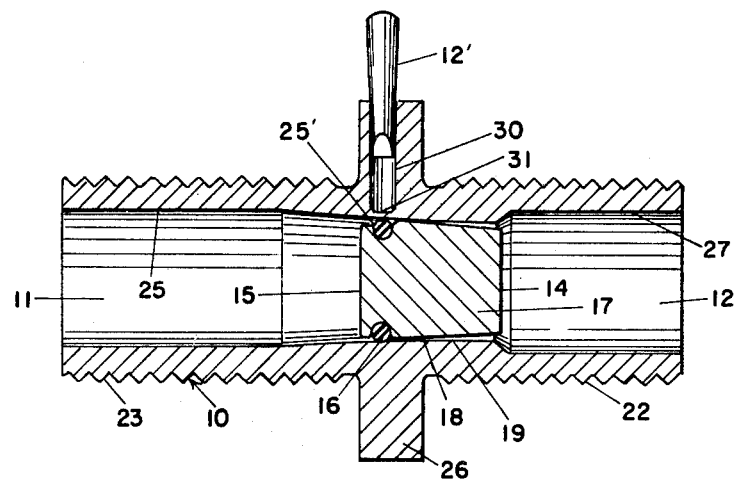
FIG. 1 is a longitudinal cross sectional view of the valve according to the invention.
Figure 2:
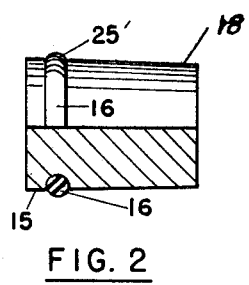
FIG. 2 is a view partly in cross section of the closure member.
Figure 3:
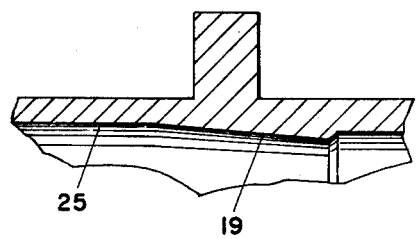
FIG. 3 is an enlarged partial cross sectional view of the valve body.

Now with more particular reference to the drawing, the valve is made up of a hollow body 10 which may be externally threaded to be used to connect a water service line to a water main and to temporarily prevent flow through the line while the connection is being made to another valve or to a piping system. It can also be used to connect any other soluble means to a fluid line where a temporary shutoff is required. Instead of the threaded ends that are shown by way of example, soldered or brazed connections could be used to connect the valve body 10 in a fluid line. Thus, the closure member will rest on the tapered surface at 19 of the body, as indicated.

The body 10 has an inlet 11 and an outlet 12. The inlet end 11 has a cylindrical inside surface and the outlet end 12 has an inside diameter slightly smaller than the inlet end 11. The cylindrical inlet 11 terminates in the tapered inside surface 19 which extends from the cylindrical surface of the inlet 11 to the cylindrical surface of outlet 12. The tapered surface 19 is engaged by the frusto-conical end 18 of the closure member 17, which is forced into contact with the tapered surface 19 of the hollow body by the liquid pressure on the upstream end of the closure member.

The closure member has the frusto-conical portion 18 and a generally cylindrical portion 15 integrally connected to the frusto-conical portion and separated from it by a groove 25 in which an O-ring 16 is supported. The major diameter of the frusto-conical portion is approximately equal to the major diameter of tapered surface 19. The frusto-conical end 18 may taper approximately five degrees to the central axis. The cylindrical surface 25 at the inlet 11 may be approximately .020 inch larger than the maximum diameter of tapered surface 19, with the actual diameter being established by the choice of O-ring. The O-ring 16 forms sealing engagement with the cylindrical inside surface of the valve body. Thus, the pressure of the water from the inlet forces the closure member toward the outlet and into contact with the tapered inside. The closure member is coated with a water insoluble coating to prevent the closure member from dissolving until it is cracked by the taper pin.

The tapered surface 19 inside of the valve forms a seat for the frusto-conical end 18, while the O-ring forms a liquid tight seal on tapered surface 19. The taper of said surface 19 may be in the range of five degrees to the central axis of the body. The taper in the body puts the brittle closure member in compression, which is the preferred method of stress for a brittle material. Thus, the brittle material will support the high pressure water. The cylindrical portion provides the correct fit for the O-ring. The hole 30 is not drilled completely through the wall of the body of the valve but a thin section is undrilled at 31, thus, a perfect surface is provided for the O-ring 16 and this avoids problems which have been derived with this type of valve. The thin section comprises a frangible member which can be fractured by the pin as mentioned hereinafter. When the pin is driven in, there is no difficulty in puncturing this thin wall section and then either nicking or cutting the O-ring 16. The pin goes in even further than this and also drives into the frusto-conical end 18. Actually, when the O-ring is nicked, this starts the slightest trickle of liquid through the valve which is enough to further dissolve the insert completely.

The hole 30 is a cylindrical hole. This seats just as well as the tapered hole and also makes it somewhat easier to drive the pin in. This means that the additional resistance to driving which may otherwise have been encountered by the thin wall through which it must be driven in effect does not cause noticeable increase in required driving force.

A tapered pin 12' is supported in a hole in the side of the valve and this may be engaged by a suitable impact tool to crush the closure member when and if it is decided to increase its rate of dissolving when the liquid is turned on. The tapered pin 12' seats itself when engaged by this impact tool.

The closure member 17 may be made of a hard candy or other soluble material coated; for example, with a coating so that it will not dissolve until it is cracked and will not render the water unpotable. When the coated closure is cracked, fine water paths flow through the closure. The flow through paths promote rapid dissolving and weakens it until water pressure forces it out into the pipe.

The valve disclosed herein may be used to temporarily close a liquid line, such as a water line that is connected to a water main.

The embodiments of the invention in which an exclusive property or privilege is claimed are defined as follows:

1. A valve for temporarily stopping the flow of a liquid from a source through a flow line comprising
a hollow body having an inlet end adapted to be connected to said source and an outlet end,
said hollow body having a surface therein between said inlet and said outlet,
a closure member in said hollow body,
said closure member having a tapered end,
said tapered end resting on said surface,
a peripheral groove in said closure member,
a sealing washer in said groove,
said sealing washer making sealing engagement with the inside surface of said body thereby preventing flow between said closure and the inside surface of said body,
said closure member being made of a potable material that is dissolvable in the fluid said line is adapted to carry,
said hollow body having a hole in one side thereof,
the bottom of said hole terminating in a frangible member,
said closure being coated with a non-soluble coating,
a tapered pin being disposed in said hole,
one end of said pin engaging said frangible member,
the opposite end extending outside said body and being adapted to be engaged by an impact member to break said frangible member and said closure.

2. The valve recited in claim 1 wherein said potable material is a hard candy-like material.

3. The valve recited in claim 2 wherein the outside of each end of said hollow body has a male thread thereon.

4. A valve for temporarily stopping the flow of a liquid from a source through a flow line comprising
a hollow body having an inlet end adapted to be connected to said source and an outlet end,
said hollow body having a surface therein between said inlet and said outlet,
a closure member in said hollow body,
means to prevent said closure member from moving in said hollow body,
a peripheral groove in said closure member,
a sealing washer in said groove,
said sealing washer making sealing engagement with the inside surface of said body thereby preventing flow between said closure and the inside surface of said body,
said closure member being made of a potable material that is dissolvable in the fluid said line is adapted to carry,
said hollow body having a hole in one side thereof,
said closure being coated with a non-soluble coating,
a tapered pin being disposed in said hole,
one end of said pin being disposed adjacent said surface,
the opposite end extending outside said body and being adapted to be engaged by an impact member to break said closure,
said hole being a blind hole having a thin section of said body at the bottom thereof.

References Cited
UNITED STATES PATENTS

| 2,223,509 | 12/1940 | Brauer | 137—67 |
| 2,347,204 | 4/1944 | Lindsay | 137—67 |
| 2,490,511 | 12/1949 | Courtot | 251—357 XR |

WILLIAM F. O'DEA, Primary Examiner

RICHARD GERARD, Assistant Examiner

U.S. Cl. X.R.

138—89